Patented Apr. 2, 1935

1,996,717

UNITED STATES PATENT OFFICE 1,996,717

STABILIZATION OF HALOGENATED HYDROCARBONS

Paul Johnson Carlisle, Niagara Falls, N. Y., assignor to E. I. du Pont de Nemours & Company, Inc., Wilmington, Del., a corporation of Delaware No Drawing. Application December 30, 1932, Serial No. 649,600

10 Claims. (Cl. 23—250)

This invention relates to the stabilization of chlorinated hydrocarbons, and in particular to the stabilization of trichlorethylene.

Chlorinated hydrocarbons as a class tend to undergo decomposition during storage with the formation of acid substances. During this decomposition odorous and sometimes colored decomposition products are formed which render the solvents unfit for certain extraction purposes, especially the extraction of food products. Further, such decomposition is undesirable, since the acidity produced by the decomposition corrodes storage tanks and shipping containers. This type of decomposition is more or less general in all chlorinated hydrocarbons. It has been found that certain materials when added to chlorinated hydrocarbons, promote stability by behaving as inhibitory catalysts for the decomposition reactions.

Such varied substances as xylene, phenols, toluene, resorcinol, guaiacol, thymol, methanol, and carbon tetrachloride have been proposed as stabilizers for chloroform. Although I have found that these materials have some stabilizing action on practically all chlorinated hydrocarbons, the action is by no means uniform and the effectiveness of these materials as stabilizers varies greatly from one chlorinated hydrocarbon to another. Some of these substances are very poor stabilizers for certain chlorohydrocarbons, and must be used in large quantities to obtain effective stabilization. Such large amounts of stabilizer may render the chlorinated hydrocarbon useless for certain extraction purposes, especially if the stabilizer has undesirable physical, chemical or physiological properties.

Hydrocarbons, for instance gasoline, have been proposed as stabilizers for trichlorethylene. These are objectionable when the solvent is used in certain processes because the comparatively large amount of gasoline required to stabilize the chlorinated hydrocarbon results in the formation of "heavy ends" which markedly increase the boiling range. Further, it is readily apparent that a substance such as gasoline because of its odor and taste, would be objectionable in solvents used for the extraction of foodstuffs.

The object of this invention is to provide a stabilizer for such chlorinated hydrocarbons as methylene chloride, tetrachlorethane or trichlorethylene, which is effective in small concentrations and which does not develop an objectionable odor or taste in the materials extracted. A further object is to provide a stabilizer for chlorinated solvents of special value in processes for the extraction treatment of coffee.

I have discovered that the decomposition of chlorohydrocarbons with the resulting development of acidity, can be reduced and inhibited by the addition of a chlorohydrocarbon extract of green or roasted coffee to the chlorohydrocarbons to be stabilized. Further, I have found that caffeine, one of the materials extracted from coffee by chlorohydrocarbons, is an effective stabilizer for chlorohydrocarbons. I have found further that my stabilizers are not only of special value in stabilizing halogenated hydrocarbons to be used for extraction of foodstuffs, but are also equally effective in stabilizing halogenated hydrocarbons for other uses, or during storage.

My process of stabilization consists in dissolving a small amount, for instance from 0.0001–0.20% of the stabilizer in the chlorinated hydrocarbon solvent. The preferred method of adding these stabilizers is to make up a concentrated solution of the coffee extract or caffeine in the chlorohydrocarbon solvent to be subsequently stabilized and adding a measured amount of this concentrated solution to the chlorinated hydrocarbon to be stabilized, for example, in stabilizing trichlorethylene measured amounts of a concentrated solution of caffeine in trichlorethylene is added to the trichlorethylene to be stabilized. Other methods according to particular situations that may arise, would readily suggest themselves to one skilled in the art.

To measure the instability of a chlorinated hydrocarbon, I have determined the acidity developed over various periods of time. In the following examples the acidity is stated in terms of the number of cubic centimeters of 0.01 normal sodium hydroxide solution required to neutralize acidity in 25 cc. of the chlorinated hydrocarbon, using phenolphthalein as the indicator.

*Example I*

One pound of freshly roasted, ground coffee was extracted with one and one-half liters of trichlorethylene for a period of 24 hours and the extract and coffee were separated by filtration. The filtrate was diluted to 2 liters with trichlorethylene. An analysis of a small sample of this extract showed that a total of 34 grams of trichlorethylene soluble material had been removed from the one pound coffee sample. Various amounts of this extract were added to unstabilized trichlorethylene in the quantities shown in the table below. These samples and control samples 7 and 8 containing no stabilizer were allowed to stand in diffused light at room temperature. The samples were analyzed for acidity when made up and at the end of 3 and 21 days' storage. The results given in the following table are expressed in cubic centimeters of 0.01 normal caustic soda required to neutralize the acidity developed in 25 cubic centimeters of solvent:

| Sample | Percent by wt. of stabilizer | Initial acidity | After 3 days | After 21 days |
|---|---|---|---|---|
|  |  | c. c. | c. c. | c. c. |
| 1 | 0.01 | 0.1 | 11.7 | 115 |
| 2 | 0.01 | 0.1 | 6.9 | 230 |
| 3 | 0.10 | 0.1 | 1.1 | 35 |
| 4 | 0.10 | 0.1 | 0.7 | 34.5 |
| 5 | 0.20 | 0.1 | 0.6 | 18.5 |
| 6 | 0.20 | 0.1 | 0.7 | 19.0 |
| 7 | None | 0.1 | 22 | 295 |
| 8 | None | 0.1 | 27 | 290 |

The results of these experiments show that the stability of the chlorohydrocarbon increased with an increase in the amount of coffee extract added and further that the acidity of the stabilized sample increased at a much slower rate than the acidity of the unstabilized samples. It was also found that by using as little as 0.20% of this extract by weight, the stability of the chlorinated hydrocarbon as indicated by acidity measurements is increased by more than 30-fold on 3 days' storage. While it is preferable to use the same chlorohydrocarbon for extracting the coffee as the chlorohydrocarbon to be stabilized, it is not necessary since for example the coffee could be extracted by using liquid methyl chloride and the extract obtained on evaporation of the solvent used for stabilizing trichlorethylene.

It should be noted in connection with the above tests that exposure of chlorinated hydrocarbons to diffused light increases the decomposition rate enormously, for example, a sample of a chlorinated hydrocarbon exposed to diffused light for 3 days would probably develop more acidity than the same sample stored in the dark for a period of 3 months or more. These accelerated decomposition tests are, however, a simple, rapid means of determining the relative effectiveness of different stabilizers and comparing the stability of stabilized halogenated hydrocarbons with unstabilized halogenated hydrocarbons.

*Example II*

Exactly the same procedure performed in Example I was performed in this case with the exception that green, ground coffee was substituted for roasted coffee. The samples in Example II were made up in the same way as the samples in Example I, and the stability tests were carried out in the same way. The results of these tests are given in the following table:

| Sample | Percent by wt. of stabilizer | Original acidity | 3 days | 21 days |
|---|---|---|---|---|
|  |  | c. c. | c. c. | c. c. |
| 1 | 0.01 | 0.1 | 0.2 | 115 |
| 2 | 0.01 | 0.1 | 0.15 | 110 |
| 3 | 0.10 | 0.1 | 0.15 | 13 |
| 4 | 0.10 | 0.1 | 0.1 | 12 |
| 5 | 0.20 | 0.1 | 0.1 | 10 |
| 6 | 0.20 | 0.1 | 0.1 | 10 |
| 7 | None | 0.1 | 22 | 295 |
| 8 | None | 0.1 | 27 | 290 |

It appears from the results of the above experiments as compared with the results of Example I that the extract from green coffee is a somewhat better stabilizer than the extract from roasted coffee. Further, the stability of the trichlorethylene increases with an increase in the amount of green coffee extract used. Samples 5 and 6 containing 0.20% by weight of green coffee extract showed no decomposition on 3 days' exposure whereas the acidity of unstabilized trichlorethylene increased more than 200 fold.

*Example III*

In this example amounts of caffeine equivalent to 0.0001–0.05% by weight were added to trichlorethylene. The samples were stored and tested as the samples in Examples I and II above. The results of these tests are given in the following table:

| Sample | Percent by wt. of stabilizer | Initial acidity | 1 day | 3 days | 7 days |
|---|---|---|---|---|---|
|  |  | c. c. | c. c. | c. c. | c. c. |
| 1 | 0.0001 | 0.4 | 18.5 | 29.1 | 65.0 |
| 2 | 0.0001 | 0.4 | 15.7 | 36.9 | 96.5 |
| 3 | 0.001 | 0.4 | 0.3 | 30 | 47.5 |
| 4 | 0.001 | 0.4 | 1.2 | 27.5 | 49.0 |
| 5 | 0.01 | 0.4 | 0.25 | 0.5 | 38.0 |
| 6 | 0.01 | 0.4 | 0.25 | 0.7 | 36.5 |
| 7 | 0.05 | 0.4 | 0.3 | 0.5 | 16.0 |
| 8 | 0.05 | 0.4 | 0.35 | 0.5 | 18.0 |
| 9 | None | 0.4 | 21.5 | 74.2 | 375.0 |
| 10 | None | 0.4 | 17.3 | 44.7 | 115.0 |

The results of the above tests show that increasing the quantity of caffeine added as a stabilizer increases the stability of the trichlorethylene. Even as little as 0.0001% by weight of caffeine shows some stabilizing action. When 0.05% by weight of caffeine is added to trichlorethylene and the samples are exposed to diffused light for 3 days, the samples so stabilized showed no increase in acidity whereas the acidity of unstabilized trichlorethylene increased almost 50 fold under the same conditions. Caffeine itself has an advantage over the coffee extracts since the addition of caffeine does not impart color to the chlorinated hydrocarbon.

Although in the examples given, I have shown only very small amounts of the stabilizers since these amounts produce sufficient stabilization for all commercial purposes, I do not intend to limit the scope of my invention thereby because larger amounts of stabilizer will give the same desirable effect. Further, my stabilizers are effective in stabilizing halogenated hydrocarbons other than the specific one shown in the above examples, for instance methylene chloride and tetrachlorethane. Still further, I have shown that caffeine, one of the constituents of my coffee extracts, stabilizes chlorohydrocarbon; but I do not intend to limit the scope of my invention thereby since there may be other constituents in my coffee extract which would stabilize halogenated hydrocarbons.

In the appended claims "coffee extract" refers to the extract of either green or roasted coffee.

I claim:

1. A method of stabilizing trichlorethylene comprising adding thereto about 0.01 to 0.20% by weight of a trichlorethylene extract of coffee.

2. A method of stabilizing chlorinated hydrocarbons comprising adding thereto about 0.0001 to about 0.05% by weight of caffeine.

3. A method of stabilizing trichlorethylene comprising adding thereto about 0.0001% to about 0.05% by weight of caffeine.

4. A stable fluid comprising trichlorethylene and about 0.01 to 0.20% by weight of a trichlorethylene extract of coffee.

5. A stable fluid comprising a chlorinated hydrocarbon and from about 0.01 to 0.20% by weight of a chlorohydrocarbon extract of coffee.

6. A stable fluid comprising a chlorinated hydrocarbon and from about 0.0001 to about 0.05% by weight of caffeine.

7. A stable fluid comprising trichlorethylene and from about 0.0001 to about 0.05% by weight of caffeine.

8. A stable fluid comprising trichlorethylene and about 0.005% by weight of caffeine.

9. A method of stabilizing a chlorinated hydrocarbon which comprises adding thereto from about 0.01 to 0.20% by weight of a chlorohydrocarbon extract of coffee.

10. A method of stabilizing trichlorethylene which comprises adding thereto about 0.005% by weight of caffeine.

PAUL JOHNSON CARLISLE.